Jan. 17, 1928.
H. D. CHURCH
1,656,726
SPRING SHACKLE CONSTRUCTION
Filed Nov. 18, 1926
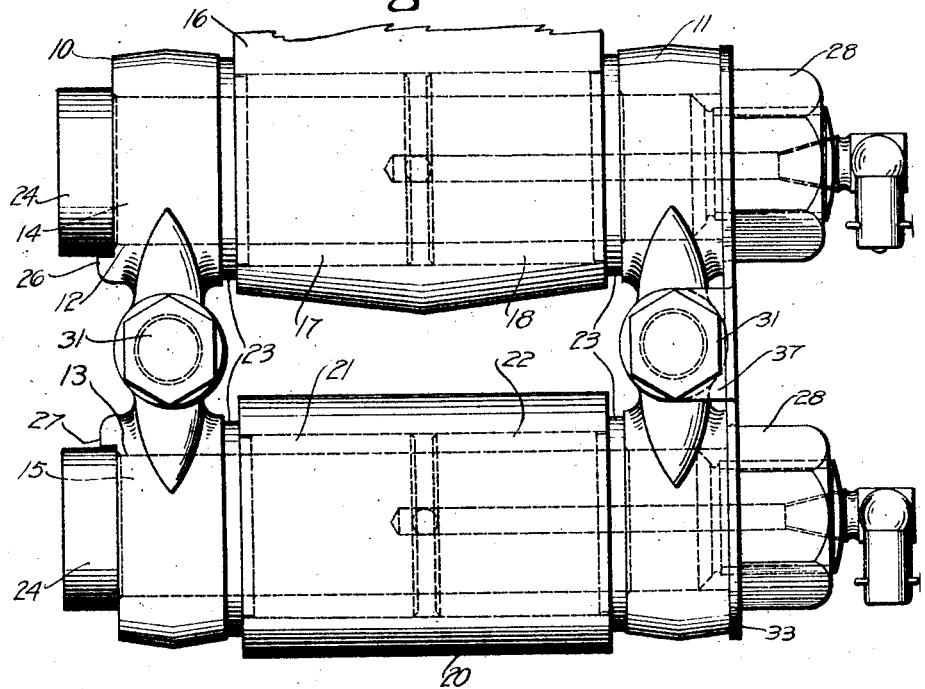
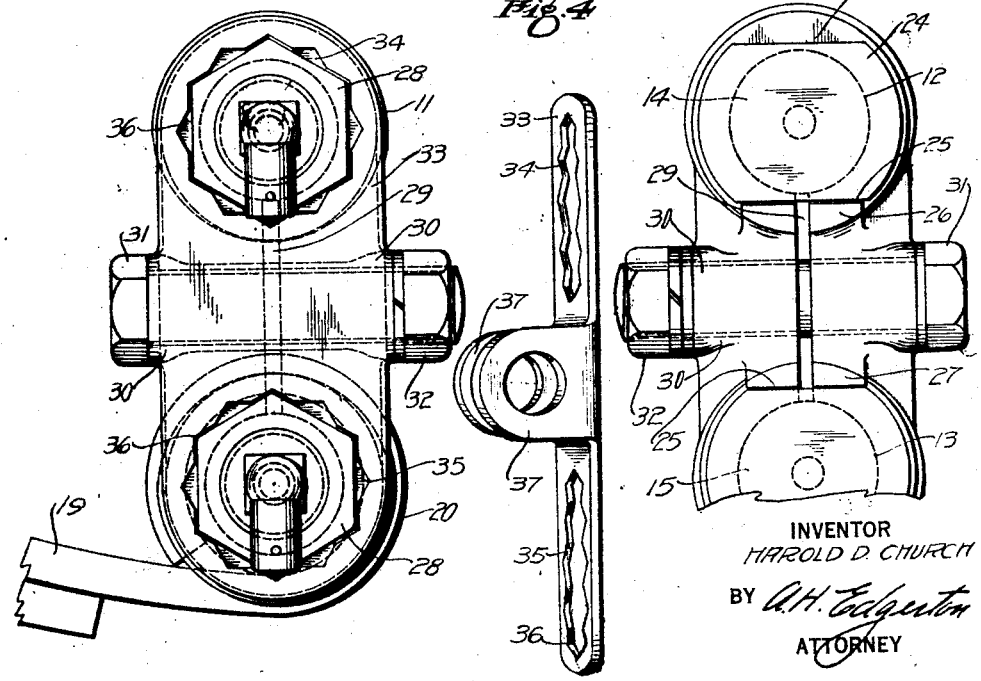
INVENTOR
HAROLD D. CHURCH
BY A. H. Edgerton
ATTORNEY Patented Jan. 17, 1928.

1,656,726

UNITED STATES PATENT OFFICE.

HAROLD D. CHURCH, OF CLEVELAND HEIGHTS, OHIO, ASSIGNOR TO THE WHITE MOTOR COMPANY, OF CLEVELAND, OHIO, A CORPORATION OF OHIO.

SPRING-SHACKLE CONSTRUCTION.

Application filed November 18, 1926. Serial No. 149,141.

This invention relates to spring shackles for vehicles and more particularly to improvements in shackles of the type embodying adjustable bearing members.

One object of the invention is to provide a construction in which the axial wear between the relatively oscillatory parts of the shackle may be taken up by an equalized adjusting mechanism which is consonant with the alignment of the spring.

Another object of the invention is to provide an effective means of simple construction for retaining the various members of the assembly in their adjusted position.

Other objects more or less ancillary to the foregoing and the invention itself, and the manner in which the various objects are obtained will be pointed out in the following description.

In the accompanying drawings which show the preferred form of construction embodying the invention, Figure 1 is an end elevation of the improved spring shackle embodying the invention including a fragmentary portion of the front spring hanger.

Figure 2 is a side elevation of the spring shackle shown in Figure 1.

Figure 3 is a side elevation of a fragmentary portion of the opposite end of the spring shackle shown in Figure 2.

Figure 4 is a detailed view in perspective of the nut locking member.

Referring to the drawings, and first to the construction shown in Figure 1, the spring shackle comprises two similarly constructed side shackle arms 10 and 11, each apertured at 12 and 13 respectively, to receive and retain the shackle bolts 14 and 15. The bolt 14, is supported by the frame member 16, intermediate its ends and is journaled in shouldered wear bushings 17 and 18, which are pressed into the frame member 16.

The lower end of the spring shackle supports a vehicle spring 19, the upper leaf of which is formed with a loop or eye 20, provided with shouldered wear bushings 21 and 22, in which the bolt 15, is journaled. The wear bushings 17, 18, 21 and 22, are preferably formed with radial flanges 23, which abut the contiguous walls of the frame member 16, and the spring eye 20, respectively, and form thrust bearings for the inner faces of the shackle arms 10 and 11. As illustrated in Figure 1, the inner ends of the bushings are spaced apart in order to permit longitudinal adjustment should the bushings become loosened and side wear occur between the inner faces of the flanges 23, and the ends of the frame member or spring eye. The shackle bolts 14 and 15, are constructed with enlarged headed portions 24, formed with peripherally flattened surfaces 25, which are engaged by bosses 26 and 27, formed in the outer face of the shackle arm 10, and which are provided to prevent relative rotation of the bolts. The opposite ends of the bolts extend beyond the shackle arm 11, and are screw-threaded to receive the nuts 28, which bear against the outer face of the shackle arm when they are adjusted into their operative position. Each shackle arm is constructed with a slot 29, extending through the body of the arm and joining the apertures 12 and 13. Intermediate the ends of each arm there is a boss 30, which is bored to receive a bolt 31, upon the outer end of which there is mounted a tightening nut 32.

The nuts 28, are retained in radial adjustment by a plate 33, provided with polygonal openings 34 and 35, adapted to telescopically engage each of the nuts 28. The openings 34 and 35, as illustrated in Figure 2, are formed with a plurality of notches 36, the angularity of each corresponding to the angle formed at the corners of the nut 28. The notches 36, are equidistantly disposed about the periphery of the opening and are arranged in the present case to permit an adjustment of one-twelfth of a revolution to be made on either of the nuts 28. The central portion of the plate 33, is formed with a pair of apertured depending ears 37, which embrace the end portions of the boss 30, and are interposed between the head of the bolt 31, the ends of the said boss and the tightening nut 32.

In making axial adjustments the tightening nuts 32, are first released and the bolt 31, which retains the plate 33, is removed so that the plate may be withdrawn from the nuts 28. After longitudinal adjustments of the shackle arms are made the plate 33, may be replaced by first aligning the nuts 28, to permit their telescopic engagement with the plate and then positioning the plate and returning and clamping the bolt 31.

It is apparent that when the tightening nuts 32, are released the clamping effort effectuated upon the bolts 14 and 15, by the distortion of the apertures 12 and 13, will be relieved and that radial adjustment now made by the nuts 28, will cause the shackle arms 10 and 11, to be simultaneously drawn toward each other thus equalizing the clearance caused by longitudinal wear. It is also apparent that the relative alignment of the frame member and vehicle spring will remain unaffected when compensatory axial adjustments are made as each shackle arm and bushing will be independently seated when the nuts 28, are adjusted thus equalizing the wear without imposing angular strains upon the ends of the spring eye or frame member.

Although the foregoing description is necessarily of a detailed character, in order that the invention may be completely set forth, it is to be understood that the specific terminology is not intended to be restrictive or confining, and that various rearrangement of detail may be resorted to without departing from the scope or spirit of the invention herein claimed:

Having described the invention what is claimed as new and what is desired to be secured by Letters Patent is:

1. In a spring shackle construction the combination with an apertured frame member and a spring eye of a flanged bushing secured in each end of the aperture in the frame member and in each end of the spring eye, shackle bolts journaled in said bushings, a pair of apertured shackle arms supported on the shackle bolts, a unitary clamping mechanism to lock each shackle arm to the bolts, adjusting nuts on the end of the shackle bolts, an apertured locking plate telescopically engaging the locking nuts and retained in securement by the unitary clamping mechanism.

2. In a spring shackle construction the combination of a pair of flanged bushings within an apertured frame member and a spring eye, shackle bolts journaled in said bushings, apertured shackle arms supported on the ends of the bolts and contiguous with said flanged bushings, adjusting nuts on the ends of the shackle bolts, a locking plate therefor and a clamping mechanism in each shackle arm to rigidly unite the shackle arm with each shackle bolt.

3. In a shackle construction the combination with a pair of shackle bolts each having a nut thereon, a shackle arm, a locking plate for the nuts and common means to clamp the arm upon the bolts and to secure the plate in nut locking position.

4. In a shackle construction the combination with a pair of shackle bolts each having a nut thereon, a pair of shackle arms, a clamping mechanism in each shackle arm for securing the shackle arms to the bolts, an apertured plate telescopically engaging the nuts and secured to one of the shackle arms by the clamping mechanism.

5. In a shackle construction, the combination with a pair of shackle bolts each having a nut thereon, a pair of parallel spaced shackle arms each apertured at both its ends and telescoped over the ends of the bolts, a clamping mechanism comprising a bolt projected through the mid-portions of the arms for securing the shackle arms to the bolts, a polygonally apertured plate telescoped over one of the nuts and secured to one of the shackle arms by said clamping mechanism bolt.

6. In a shackle construction, the combination with a pair of shackle bolts each having a nut thereon, a pair of parallel spaced shackle arms each apertured at both its ends and telescoped over the ends of the bolts, a clamping mechanism comprising a bolt projected through the mid-portions of the arms for securing the shackle arms to the bolts, a polygonally apertured plate telescoped over both of the nuts and secured to one of the shackle arms by said clamping mechanism bolt.

In testimony whereof I hereunto affix my signature this 16 day of November, 1926.

HAROLD D. CHURCH.